3,411,930
POLISHABLE METAL POWDER UNDERCOATING
Paul J. Reising, 32867 Robinhood Drive,
Birmingham, Mich. 48010
No Drawing. Filed Aug. 8, 1963, Ser. No. 300,908
14 Claims. (Cl. 117—8)

ABSTRACT OF THE DISCLOSURE

Automobile body parts such as metal panels are coated with a corrosion resistant metal powder-containing material. A top layer of paint, lacquer or suitable top coating is applied over the metal powder. Certain areas are then machined (mechanical abrading) to exposed desired portions of the undercoating. The abrading causes the metal powder layer to be polished and effects a lustrous finish to the exposed areas.

---

This invention relates to decorative articles and to a method for decoratively coating sheet metal, metal die castings and the like. More particularly the invention relates to a method for providing a highly corrosion resistant decorative surface which is a composite of organic base lacquer, paint or enamel and metallic trim portions which gives the appearance of chrome plating, stainless steel, satin finished aluminum or the like. The invention has particular utility for decoratively finishing automobile bodies and parts therefore such as fenders, door panels, bumpers etc.

In the manufacture of automobile bodies it is presently the conventional practice to provide the decorative exterior finish by first coating with paint or lacquer and thereafter attaching stainless steel, aluminum or chromium plated trim strips, window moldings, panels etc. by means of metal clips which extend through punched openings in the vehicle body panels. Such decorative metal parts and the means for attachment thereof result in body rusting and corrosion even after only a short period of vehicle use, particularly in the northern climates where salt is used to keep the roads clear of snow and ice. Hence, there is a need for a better method to decoratively finish automobile bodies. The present invention fulfills this need.

It is an object of the present invention to provide an improved low-cost method for decoratively finishing automobile bodies, metal parts therefore and the like, and to provide improved low cost decorative articles.

Another object of the invention is the provision of a method for manufacturing decoratively trimmed automobile bodies and the like which are highly resistant to rust or other corrosion and to provide improved corrosion resistant automobile bodies and the like made thereby.

Still another object of the invention is to provide a method whereby decoratively trimmed automobile bodies or the like can be manufactured at greatly reduced cost.

A still further object of the invention is the provision of a method for manufacturing a decoratively trimmed automobile body or the like which method affords the body stylist substantially unlimited choice as to the location, finish and amount of metallic trim without any increase in manufacturing costs.

Briefly, these objects are accomplished in accordance with the invention by first coating the automobile body, metal panel or other part with a layer of a corrosion resistant metal powder-containing material which can be polished to high luster, then coating with paint, lacquer or the like, and thereafter machining or buffing away the paint or lacquer in those areas where polished metallic trim is desired, such machining or buffing operation simultaneously polishing the metallic undercoat to provide the desired metallic trim. Hence, the metallic undercoat serves two important functions. First, it provides a corrision resistant layer on the metal to prevent rusting or other corrosion even though some paint may be chipped away as by stone bruises or the like. Secondly, it provides the polished metallic trim in any area where such is desired, this by merely machining or buffing away the paint in such areas. The invention therefore eliminates the present day requirements for chrome plated, stainless steel or brushed aluminum window moldings, decorative side strips etc. Thereby greatly reducing manufacturing costs and eliminating the rust and corrosion problems attendant thereto.

Other objects, features and advantages of the invention will appear more clearly from the following detailed description of preferred embodiments thereof. Such detailed description shall be specifically with reference to the manufacture of a decoratively finished automobile body though it will be understood that the invention can be used for the manufacture of various other items and component parts.

The steel panels for the automotive body can be stamped and welded or otherwise secured together by conventional techniques. Preferably, however, the panels, such as the door panels or the fender panels, are stamped to provide a depressed or raised ridge at the location where a decorative metallic trim strip is desired in the finished body. For example, if the stylist desires that the body have a longitudinally extending lustrous metallic trim strip extending from the front to the back fender and through the front and rear doors, the panels for these parts are initially stamped with a longitudinally extending ridge having the same width as the desired trim strip. Likewise, if say a raised metallic decorative molding is desired around the rear window of the vehicle body, then the stamping for the roof should have a raised ridge in such location.

After the body is assembled by conventional techniques it is de-greased and cleaned in the usual manner and is then coated as by dipping or spraying with a metal powder-containing material which has high corrosion resistance and which can be worked, as by buffing or peening to a good luster. By far the preferred material for such metallic undercoating is that covered by United States patent application Ser. No. 291,271 filed June 28, 1963 now U.S. Patent 3,248,251. Such coating comprises a slurry of metal powder, preferably aluminum powder and with a grain size of less than 325 mesh, in an aqueous solution containing substantial amounts of phosphate ion, chromate or dichromate ion and metal ion. Examples Nos. 1, 2, 7, 9, 10 and 12 of said patent are specifically illustrative of the coatings which can be used for the practice of the present invention, the composition set forth in Examples 1, 2 and 7 being outstanding by reason of their excellent corrosion protection. If desired, metal powders other than aluminum or mixtures of metal powders may be used, for example a mixture of aluminum powder and zinc powder, chromium powder, etc. It will be understood that the full disclosure of said patent of coating compositions wherein the powdered or solid particulate material is formed at least in part by a metal powder is applicable hereto and forms a part hereof by reference; however for purposes of immediate and specific illustration of a coating outstandingly superior for the practice of the present invention, Example 1 of said patent application is here repeated.

Aluminum powder
 (Spherical, 5–10 micron) _____grams__ 80
Phosphate-chromate
 (dichromate) metal ion solution _____cc__ 100
Solution made by mixing:
 $H_3PO_4$ (85% aqueous solution) ____cc__ 20
 MgO _____grams__ 5
 $Mg(H_4PO_4)_2.3H_2O$ _____do____ 5
 $MgCr_2O_7.6H_2O$ _____do____ 15
Water _____cc__ To 100

Such coating compositions cure to complete water insolubility by heating to about 600–650° F. for from 5 to 15 minutes. If, for the practice of the present invention it is desired to use a material which cures at a lower temperature, reference is made to United States patent applications Ser. Nos. 291,268 and 291,270, both filed June 28, 1963, now U.S. Patents 3,248,249 and 3,248,250, respectively, the disclosures thereof also being incorporated herein by reference. For certain embodiments of the present invention, an organic polymer containing metal powder layer may be useful though in general they are not preferred.

After the metallic coating, for example that set forth above, is applied as by spraying either the entire body or at least those portions of the body where decorative trim is desired, heat is applied to fully cure the coating to complete water insolubility. Infra red lamps can be used to advantage for the curing step. Then, after cooling, the body is painted or lacquered in the usual manner. The cured metallic undercoat not only adheres well to the body but also serves as an excellent base for the paint or lacquer. After the lacquer or paint (paint, lacquer, enamel or the like herein are referred to generically by the term "organic base coating") is dry, it is machined or otherwise mechanically abraded away from the body in those areas where decorative metallic trim is desired. Such machining or other abrading can be accomplished, for example, by buffing or peening. By reason of such buffing or peening the metallic undercoat is worked to a lustrous finish which duplicates the appearance of conventional metallic trim strips etc. used on automobile bodies. The good adherence and toughness of the undercoat are such that there is no problem of it being machined away with the paint or lacquer overcoat. As a matter of fact, the buffing or peening of the undercoat tends to work it into the metal of the body panel to provide an even stronger bond.

The precise metallic surface finish accomplished will depend upon the particulars of the machining, buffing or peening operation used and upon the precise metallic composition of the undercoat. Hence, by varying the metal powder both as to composition and as to the shape and size of the metal particles, and by varying the polishing operation the amount of gloss and other characteristics of the resulting trim strip or molding can be changed. By far the best metallic finishes can be accomplished by using aluminum powder in the undercoat, the aluminum powder also contributing greatly to the corrosion protection afforded by the material. The following will serve to outline the composition and processing variations which can be used to obtain different decorative surface finishes for the metallic trim which results when the paint or lacquer overcoat is machined away.

Combinations of various metal powders can be used in the undercoat compositions though in all instances it is by far preferable that at least the major amount of metal powder be aluminum. Flake aluminum or spherical aluminum powder can be used depending upon the precise surface finish desired.

Coloring pigments can be included in the undercoat composition to provide pastel color effects. For example, cobalt oxide can be included whereby the final polished trim will have a pastel blue color.

Steel slot peening can be used to remove the paint and polish the undercoat whereby a satin finish trim of exceptionally pleasing appearance can be obtained.

High speed metal wire, cloth or the like buffing wheels can be used to remove the paint and polish the undercoat to attain different decorative finish effects. Heat, even sufficient to soften the paint or lacquer, can be applied during the paint removal and undercoat buffing or polishing operation to expedite the operation or to attain different decorative effects. If a wire or other electrically conductive rotary or the like brush is used, electrical current can be applied so as to pass between the brush and the body panel as the paint is machined away and the undercoat polished. Such may be used to electrically machine the surface or generate heat.

A polishing brush with bristles of a selected metal or combinations of metals may be used to cause certain of the metal from the bristles to deposit and embed in the undercoat to provide special decorative effects. In conjunction therewith, ceramic powders such as aluminum oxide powder or the like can be included in the undercoat material to provide increased abrasiveness. Also, it may be desirable to machine the paint away in such a manner that fragments of the paint or paint pigment embed in the metallic undercoat whereby special decorative effects can be attained. This would be of advantage where it is desired that the metallic trim have a slight color hue which matches the paint or lacquer of the automobile body.

Hence, it will be obvious that many modifications and variations are possible to accomplish special metallic finish decorative effects, all in accordance with the invention.

Where it is necessary to smooth out a nick, crevice or the like in the body such as often occurs during manufacture, body solder may be used prior to applying the metallic undercoat or, if desired, compositions such as those covered in United States patent application Ser. No. 291,246 filed June 28, 1963, now U.S. Patent 3,352,814, may be employed to fill such nicks or other depressions. Example No. 11 of said Patent 3,352,814 will serve to illustrate such compositions.

It will be manifest that by the practice of the present invention a highly improved decoratively trimmed automobile body with exceptionally good rust and corrosion protection can be manufactured with great simplicity and at low cost. The need for chrome plated, stainless steel or the like trim strips, window moldings, head lamp moldings escutcheon plates, grill work etc. can be completely eliminated, it only being necessary with the present invention to machine away the paint and polish the undercoat wherever such metallic decorate trim is desired. This affords the body stylist almost unlimited options for the placement, finish and amount of metallic body trim. For example, the brand name of the vehicle can be placed, say on the front fender, by merely laying on the painted fender a templet spelling the name and then running a buffing wheel over the templet to machine away the paint and polish the undercoat to high luster. By similar technique the customers initials could easily be provided in lustrous metallic finish, say on the upper part of the front door panel. Generally, it will, of course by necessary to mask the paint or lacquer to either side of the area where the metallic trim is desired during the machining operation whereby the paint is removed and the undercoat polished.

One of the current automobile styling schemes is to secure to the body a satin finished aluminum panel bordered by chrome strips. In accordance with the present invention a similar effect can be attained at lower cost and with greatly increased corrosion protection, by initially forming the steel body panel to the shape desired (i.e. with a raised ridge encircling or bordering the portion which would normally be formed by the aluminum panel) and then, after undercoating and overcoating as aforesaid, machining away the paint along the border, on the raised ridge, so as to provide a high polish to duplicate the appearance of chrome and machining away the paint in the center portion, between such raised polished border portions, in such a way as to provide a satin or low gloss finish to the undercoat. High polishing will accomplish the desired higher gloss and light peening the latter i.e. the satin finish.

It will be understood that while the invention has been described specifically with reference to certain preferred embodiments thereof, various changes and modifications may be made all within the full and intended scope of the claims which follow:

I claim:

1. A method for decoratively finishing an article comprising the steps of coating at least a portion of said article with a layer of a mixture containing bonding material and powdered metal, overcoating said layer with an opaque organic-base coating, and then mechanically abrading away said opaque coating from selected portions of the surface of said article to thereby expose said layer and work the powdered metal therein to a lustrous finish.

2. A method as set forth in claim 1 wherein said bonding material comprises a heat cured mixture of metal phosphate and a material from the group consisting of metal chromates and metal dichromates.

3. A method as set forth in claim 1 wherein said powdered metal is aluminum powder.

4. A method for manufacturing a decoratively finished article comprising the steps of forming a base member with a raised surface portion, coating at least the raised surface portion of said base member with a layer of a mixture containing bonding material and powdered metal, overcoating said layer with an opaque organic-base coating, and then mechanically abrading away said opaque coating from said raised surface portion to thereby expose said layer and work the powdered metal therein to a lustrous finish.

5. A method as set forth in claim 4 wherein said powdered metal is aluminum powder.

6. A method as set forth in claim 4 wherein said bonding material comprises a heat cured mixture of metal phosphate and a material from the group consisting of metal chromates and metal dichromates.

7. A method for manufacturing a decoratively finished article comprising the steps of forming a base member with a depressed surface portion, coating at least the depressed surface portion of said base member with a layer of a mixture containing bonding material and powdered metal, overcoating said layer with an opaque organic-base coating, and then mechanically abrading away said opaque coating in said depressed surface portion to thereby expose said layer and work said powdered metal to a lustrous finish.

8. A method as set forth in claim 7 wherein said powdered metal is aluminum powder.

9. A method as set forth in claim 7 wherein said bonding material comprises a mixture of metal phosphate and a material from the group consisting of metal chromates and metal dichromates.

10. A method for decoratively finishing an article comprising the steps of coating at least a portion of said article with a layer of a mixture containing bonding material and powdered metal, overcoating said layer with an opaque organic-base coating, and then mechanically abrading away said opaque coating from selected portions of the surface of said article to thereby expose said layer and work the powdered metal therein to a lustrous finish, said mechanical abrasion being such as to leave fragments of the opaque organic-base coating adhering to the exposed portions of said layer.

11. An article of manufacture comprising a base member having thereon a layer of a corrosion resistant mixture containing bonding material and powdered metal and a coating of opaque organic-base material over said layer, said organic-base coating being discontinuous whereby portions of said layer are exposed, the powdered metal in said portions being worked to a lustrous finish.

12. An article of manufacture as set forth in claim 11 wherein said powdered metal is aluminum powder.

13. An article of manufacture as set forth in claim 11 wherein said bonding material is a mixture containing metal phosphate and a material from the group consisting of metal chromates and metal dichromates.

14. An article of manufacture as set forth in claim 11 wherein the exposed portion of said layer has fragments of said organic-base coating adhered thereto.

References Cited

UNITED STATES PATENTS

| | | | |
|---|---|---|---|
| 2,529,348 | 11/1950 | Mustee | 29—529 |
| 2,884,693 | 5/1959 | Wagner | 29—529 |
| 2,939,207 | 6/1960 | Adler | 29—195 |
| 3,114,612 | 12/1963 | Friedrich | 29—195 |
| 3,305,384 | 2/1967 | Kenderi | 117—71 |
| 3,248,251 | 4/1966 | Allen | 106—286 |
| 3,248,250 | 4/1966 | Collins | 106—286 |
| 3,248,249 | 4/1966 | Collins | 106—286 |
| 3,066,033 | 11/1962 | Clark | 117—6 X |
| 2,999,771 | 9/1961 | Gaynes | 117—5.5 X |
| 2,704,410 | 3/1955 | Morrison | 117—8 |
| 1,488,240 | 3/1924 | Gulick | 117—8 |

ALFRED L. LEAVITT, *Primary Examiner.*

A. M. GRIMALDI, *Assistant Examiner.*